United States Patent [19]
Espindola et al.

[11] Patent Number: 6,115,519
[45] Date of Patent: Sep. 5, 2000

[54] TAPERED OPTICAL FIBER DEVICES WITH VARIABLE INDEX COATINGS FOR MODIFYING GUIDE PROPERTIES OF THE FUNDAMENTAL MODE

[75] Inventors: Rolando Patricio Espindola, Chatham; Andrew John Stentz, Clinton, both of N.J.; Jefferson Lynn Wagener, Aberdeen, Wash.

[73] Assignee: Lucent Technologies Inc., Murray Hill, N.J.

[21] Appl. No.: 09/159,705

[22] Filed: Sep. 24, 1998

[51] Int. Cl.$^7$ ........................................... G02B 6/26

[52] U.S. Cl. .................. 385/43; 385/24; 385/48

[58] Field of Search .................. 385/43, 37, 27, 385/24, 6, 10, 122, 123, 124, 128, 48

[56] References Cited

U.S. PATENT DOCUMENTS 5,530,781  6/1996  Takahashi ................................. 385/43

*Primary Examiner*—Phan T. H. Palmer
*Attorney, Agent, or Firm*—Mathews, Collins, Shepherd & Gould, P.A.

[57] ABSTRACT

An improved optical fiber device includes a length of optical fiber having a longitudinally tapered region for causing a portion of light signals guided by the fiber to emerge outside of the fiber. The tapered region is surrounded by a coating that operates on the portion of the light signals emerging from the fiber to modify their propagation properties. The tapered optical fiber device can be used in an optical fiber system which includes at least one source of light signals, wherein the optical fiber device is disposed in the path of light signals from the source.

27 Claims, 2 Drawing Sheets

TAPERED OPTICAL FIBER DEVICES WITH VARIABLE INDEX COATINGS FOR MODIFYING GUIDE PROPERTIES OF THE FUNDAMENTAL MODE

FIELD OF THE INVENTION

This invention relates to optical fiber devices and systems using them. In particular, it concerns tapered optical fiber devices with variable index coatings for modifying the guide properties of the fundamental mode.

BACKGROUND OF THE INVENTION

Optical fibers are fundamental components in modern telecommunications systems and sensing systems. A typical optical fiber includes a core of a first index of refraction surrounded by a cladding of a second lower index of refraction. Optical fibers are typically made of high-purity silica with minor concentrations of dopants to control the index of refraction. Light rays impinging upon the core at an angle less than a critical acceptance angle undergo total internal reflection within the fiber core and pass through the fiber with minimum attenuation. This enables optical fibers to transmit optical signals containing a large amount of information over long distances with very low loss.

Designs for optical fibers vary depending upon the application, the desired mode of transmission of the light beam, and the materials used in fabrication. Some optical fiber designs use tapered fiber structures (e.g., fibers having a gradually decreasing outer diameter) for coupling fibers together and for making small fiber tips for probes or sensors. For example, tapered fibers for use in coupling are disclosed in U.S. Pat. No. 5,729,643, issued Mar. 17, 1998 to Hmelar, et al., "Tapered Composite Optical Fiber and Method of Making the Same"; U.S. Pat. No. 4,931,120, "Method of Tapering End of Capillary Tube Bore for Optic Fiber Coupling, and U.S. Pat. No. 4,671,609, "Coupling Monomode Fiber Having a Tapered End Portion." Tapered fibers used as probes or sensors are disclosed in U.S. Pat. No. 5,430,813, issued Jul. 4, 1995 to Anderson et al., "Mode-matched, Combination Taper Fiber Optic Probe,"; U.S. Pat. No. 5,703,979, "Cylindrical Fiber Probe Devices," assigned to Lucent Technologies, Inc., the assignee herein; and U.S. Pat. No. , 5,093,569, "Tapered Optical Fiber Sensor."

Advancements in optical fiber systems, such as telecommunications systems, have created a need for other types of optical fiber designs, such as optical fiber-based modulators and attenuators. Unfortunately, existing designs are expensive and difficult to implement. Accordingly, there is a need for improved optical fiber-based modulators and attenuators and optical fiber systems which use them.

SUMMARY

In accordance with the present invention, an improved optical fiber device comprises a length of optical fiber with a longitudinally tapered region which causes a portion of light signals guided by the fiber to emerge outside of the fiber. The tapered region is surrounded by a coating that operates on the portion of the light signals emerging from the fiber to modify their propagation properties. In further accordance with the present invention, an optical fiber system comprises at least one source of light signals and the above-described optical fiber device disposed in the path of light signals from the source.

BRIEF DESCRIPTION OF THE DRAWINGS

The advantages nature and various additional features of the invention will appear more fully upon consideration of the illustrative embodiments now to be described in detail in connection with the accompanying drawings wherein.

It is to be understood that these drawings are for purposes of illustrating the concepts of the invention and, except for graphical illustrations, are not to scale.

DETAILED DESCRIPTION OF THE INVENTION

Figure 1:
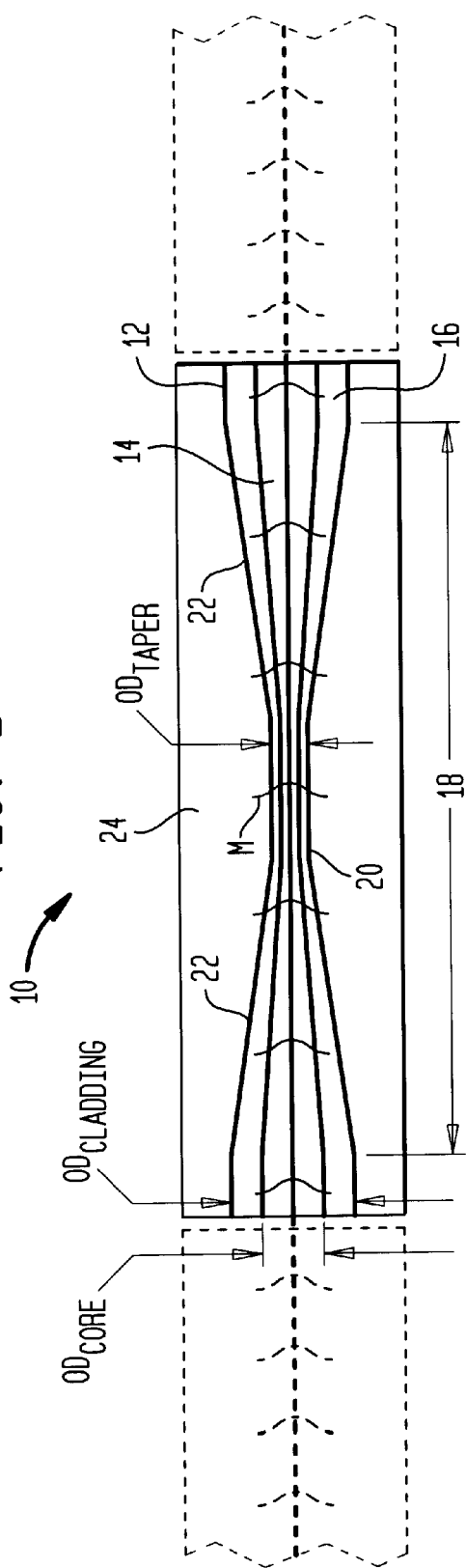
FIG. 1 is a side-cross section of a fiber device.

FIG. 1 is a side-cross section of a fiber device 10 which modifies the propagation behavior of the fundamental or core mode of light rays guided along its axis. The fiber device 10 comprises a cladded single mode stepped index or graded index optical fiber 12 having a circular inner core 14 surrounded by at least one cladding layer 16. The core 14 is of a relatively high index of refraction (stepped or graded) and the cladding 16 is of a slightly lower index of refraction as compared to the core 14. The core 14 is typically germanium-doped silica, and the cladding layer 16 is typically silica or fluorine-doped silica. The fiber 12 includes a tapered region 18 which includes a minimum outer diameter section 20 and two adiabatic tapered sections 22. The tapered region 18 is surrounded by a coating 24 of a variable index or a variable loss material. Coatings of variable index materials have indices of refraction which can be selectively varied by applying an electric field or a magnetic field to the coating, or by heating and/or cooling the coating. Coatings that are index responsive to electric and magnetic field typically comprise electro-optic or magneto-optic materials such as liquid crystals. Well known temperature sensitive polymers can be used when heat sensitive variable index coatings are desired. Coatings of variable loss materials have light absorption or light scattering properties which can be selectively varied by an electric field or temperature.

The tapered region 18 provides lossless operation and is appropriately sized to cause a non-negligible portion of the fundamental mode M to expand beyond or outside of the cladding 16 into the coating 24 surrounding the cladding 16 as light passes through the tapered region 18. This is due to the shrinking core diameter $OD_{core}$ which results in weaker bounding of the fundamental mode, and therefore, an expansion of the fundamental mode field diameter. With the fundamental mode M extending outside the cladding 16, the coating 24 can be used for selectively changing the mode's propagation behavior. Depending upon the properties of the coating 24, the fiber device 10 can be advantageously used in optical fiber systems, such as optical fiber telecommunications systems, as a broadband optical signal modulator, a broadband optical signal attenuator, or a broadband optical signal variable attenuator.

The fiber device 10 can be used as an optical signal modulator or optical signal attenuator when the coating 24 consists of a variable index material having an index of refraction (index) which can be selectively varied between an index that is below the index of the fiber cladding 16 and an index that is at or above the index of the fiber cladding 16. When the index of the coating 24 is adjusted below the index of the cladding 16 (provides a standard guide index for the fundamental mode), the fiber device 10 operates conventionally to guide rays along the axis of the fiber with minimum attentuation. When the index of the coating 24 is adjusted to or just above the index of the cladding 16, the fiber 10 operates as an attenuator because the fundamental mode M becomes radiative.

The fiber device 10 can also operate as a variable optical attenuator when the coating 24 consists of a variable loss material that has light absorption or light scattering properties which can be selectively varied. Increases in attenuation can be obtained by selectively increasing the light absorption or light scattering property of the coating.

A fiber device similar to the device 10 shown in FIG. 1 can be made using a step index fiber with a 1% delta core index, a core $OD_{core}$ of 5 microns and cladding $OD_{cladding}$ of 125 microns. The fiber is placed under tension and heated with an oxy-acetylene torch until the fiber begins to stretch. Translating the ends of the fiber at different rates so that the fiber moves through the flame of the torch creates the tapered region. Drawing process typically uses a rate of about 1 centimeter/minute for one end of the fiber, and a starting translating rate of about 1 centimeter/minute for the second end of the fiber. The translation rate of the second end of the fiber is typically increased to about 39 centimeters/minute in a linear manner over about 6 seconds. This rate is maintained for about 3 seconds and then reduced to about 1 centimeters/minute over about 6 seconds. Such a drawing process produces a tapered region in the fiber having a minimum outer diameter section with a length of about 2 centimeters and an outer diameter $OD_{taper}$ of about 20 microns. The adiabatic tapered sections produced in the tapered region each have a length of about 1 centimeter. The completed tapered region is coated with a variable index coating selected to produce a desired propagation behavior in the fundamental mode.

Figure 2:
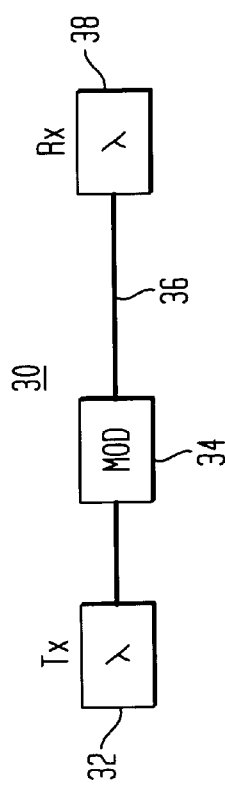
FIG. 2 schematically illustrates a single-channel optical fiber communications system using a tapered fiber device as a modulator.

FIG. 2 schematically illustrates a single-channel optical fiber communications system 30 using a tapered fiber device as a modulator. The system 30 comprises a transmitter 32 that produces optical signals at a wavelength λ, a tapered fiber modulator 34, a length of optical transmission fiber 36, and a receiver 38. The tapered fiber modulator 34 modulates the optical signals produced by the transmitter 32. It should be understood the the tapered fiber device used in this system can also comprise an attenuator.

Figure 3:
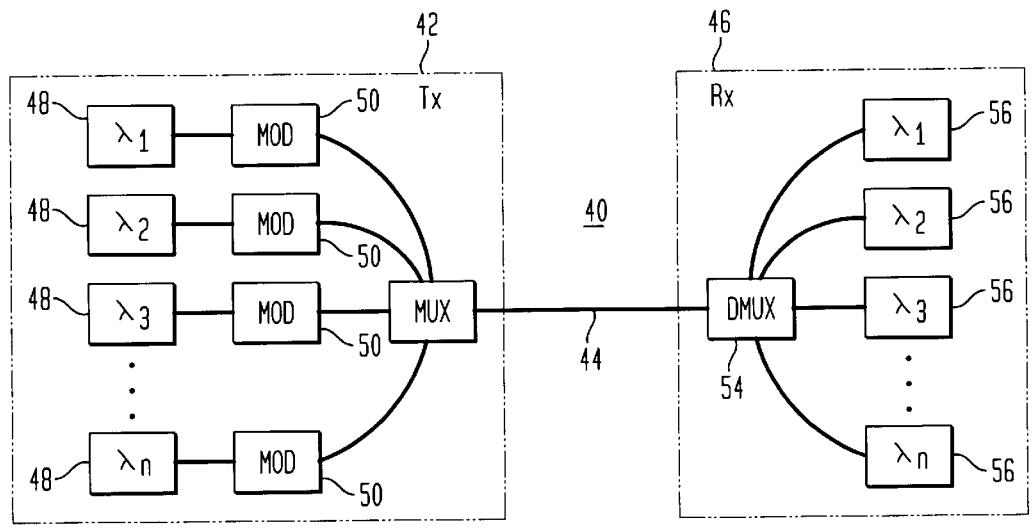
FIG. 3 schematically illustrates a multiwavelength optical fiber communications system using tapered fiber devices as modulators.

FIG. 3 schematically illustrates a multiwavelength optical fiber communications system 40 using tapered fiber devices as modulators. The system 40 comprises a transmitter 42, a length of optical transmission fiber 44, and a receiver 46. The transmitter 42 includes a plurality of sources 48 of optical signals at a respective plurality of wavelengths $λ_1$, $λ_2$, $λ_3$, a plurality of individually controlled tapered fiber modulators 50 for modulating the optical signals respectively produced by the optical signal sources 48 and a wavelength division multiplexer 52 for combining the modulated optical signals. The receiver 46 includes a wavelength division demultiplexer 54 for separating the optical signals and a plurality of optical receivers 56 for detecting the optical signals.

Figure 4:
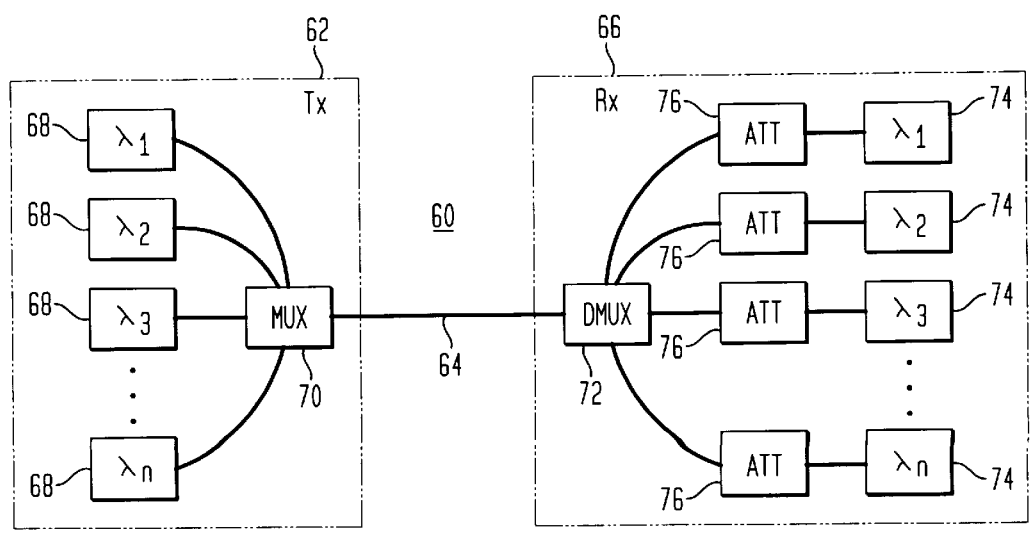
FIG. 4 schematically illustrates a multiwavelength optical fiber communications system using tapered fiber devices as attenuators.

FIG. 4 schematically illustrates a multiwavelength optical fiber communications system 60 using tapered fiber devices as attenuators. The system 60 comprises a transmitter 62, a length of optical transmission fiber 64, and a receiver 66. The transmitter 62 includes a plurality of sources 68 of optical signals at a respective plurality of wavelengths $λ_1$, $λ_2$, $λ_3$, ... $λ_n$ and a wavelength division multiplexer 70 for combining the optical signals. The receiver 66 includes a wavelength division demultiplexer 72 for separating the optical signals, a plurality of optical receivers 74, and a plurality of individually controlled tapered fiber attenuators 76 for attenuating the opticals signals in order to equalize the power detected at each of the receivers 74.

While the foregoing invention has been described with reference to the above embodiments, various modifications and changes can be made without departing from the spirit of the present invention. Accordingly, modifications and changes such as those suggested above but not limited thereto are considered to be within the scope of the claims.

What is claimed is:

1. An optical fiber device comprising:
    a length of optical fiber for guiding light signals impinging at an end of the fiber;
    a longitudinally tapered region of the optical fiber for causing a portion of the guided light signals to emerge outside of the fiber; and
    a coating surrounding the tapered region of the fiber comprising a variable loss or variable index material having light propagation properties that may be selectively varied by application of at least one of an electric field, magnetic field, and temperature, wherein the coating operates on the portion of the light signals emerging from the fiber to change their propagation characteristics.

2. The device according to claim 1, wherein the coating comprises a variable index material having a refractive index which can be selectively varied to permit a selected amount of the light signals to radiate from the fiber.

3. The device according to claim 2, wherein the variable index material is selected from the group consisting of electro-optic materials, magneto-optic materials and temperature sensitive materials.

4. The device according to claim 1, wherein the fiber device comprises a modulator.

5. The device according to claim 1, wherein the fiber device comprises an attenuator.

6. The device according to claim 1, wherein the coating comprises a variable light loss material .

7. The device according to claim 1, wherein the fiber device comprises a variable attenuator.

8. The device according to claim 1, wherein the fiber includes a core region surrounded by at least one cladding region.

9. The device according to claim 1, wherein the fiber has a stepped index.

10. The device according to claim 1, wherein the fiber has a graded index.

11. The device according to claim 1, wherein the tapered region of the fiber includes a minimum outer diameter section and at least one adiabatic tapered section.

12. An optical fiber system comprising:
    at least one source of light signals;
    a tapered optical fiber device disposed in the path of light signals from the source, the fiber device comprising a length of optical fiber for guiding the light signals produced by the source, the optical fiber having a longitudinally tapered region for causing a portion of the guided light signals to emerge outside of the fiber and a coating surrounding the tapered region comprising a variable loss or variable index material having light propagation properties that may be selectively varied by application of at least one of an electric field, magnetic field, and temperature, wherein the coating operates on the portion of the light signals emerging from the fiber to change their propagation characteristics.

13. The system according to claim 12, wherein the coating comprises a variable index material having a refractive index which can be selectively varied to permit a selected amount of the light signals to radiate from the fiber.

14. The system according to claim 13, wherein the variable index material is selected from the group consisting of electro-optic materials, magneto-optic materials and temperature sensitive materials.

15. The system according to claim 12, wherein the fiber device comprises a modulator.

16. The system according to claim 12, wherein the fiber device comprises an attenuator.

17. The system according to claim 12, wherein the coating comprises a variable light loss material.

18. The system according to claim 12, wherein the fiber device comprises a variable attenuator.

19. The system according to claim 12, wherein the fiber includes a core region surrounded by at least one cladding region.

20. The system according to claim 12, wherein the fiber has a stepped index.

21. The system according to claim 12, wherein the fiber has a graded index.

22. The system according to claim 12, wherein the tapered region of the fiber includes a minimum outer diameter section and at least one adiabatic tapered section.

23. An optical fiber telecommunications system comprising:

at least one source of light signals;

a tapered optical fiber device disposed in the path of light signals from the source, the fiber device comprising a length of optical fiber for guiding the light signals produced by the source, the optical fiber having a longitudinally tapered region for causing a portion of the guided light signals to emerge outside of the fiber and a coating surrounding the tapered region for operating on the portion of the light signals emerging from the fiber to change their propagation characteristics, and further comprising at least one receiver for detecting the light signals processed by the at least one fiber device and a second length of optical fiber transmitting the light signals from the source to the receiver.

24. The system according to claim 23, wherein the at least one source of light signals is a plurality of sources of light signals and the at least one receiver is a plurality of receivers for detecting the light signals from the sources, and further comprising a wavelength division multiplexer for combining light signals produced by the sources and a wavelength division demultiplexer for separating the light signals for distribution to the receivers.

25. The system according to claim 24, wherein the tapered fiber device comprises a plurality of tapered fiber devices disposed between the sources and the multiplexer for modulating the light signals produced by the sources.

26. The system according to claim 24, wherein the tapered fiber device comprises a plurality of tapered fiber devices disposed between the demultiplexer and the receivers for attenuating the light signals detected by the receivers.

27. The system according to claim 23, wherein the tapered fiber device modulates the light signal produced by the source.

* * * * *